United States Patent [19]

Mas

[11] 3,732,481

[45] May 8, 1973

[54] METHOD AND APPARATUS FOR CHARGING BATTERIES

[76] Inventor: Joseph A. Mas, 3 Maple Way, Woodbury, N.Y. 11797

[22] Filed: May 7, 1970

[21] Appl. No.: 35,352

[52] U.S. Cl. ...................320/14, 320/20, 320/21, 320/46
[51] Int. Cl. ..............................H02j 7/10
[58] Field of Search......................320/5, 14, 20–22, 320/39, 40, 46, 52

[56] References Cited

UNITED STATES PATENTS

| 3,614,583 | 10/1971 | Burkett et al. | 320/21 X |
| 3,517,293 | 6/1970 | Burkett et al. | 320/24 X |
| 2,503,179 | 4/1950 | Tichenor | 320/14 |
| 3,460,019 | 8/1969 | Mas | 320/46 |
| 3,559,025 | 1/1971 | Burkett et al. | 320/5 |
| 3,175,146 | 3/1965 | Rowe | 320/46 X |
| 3,123,758 | 3/1964 | Giacalone | 320/46 X |

Primary Examiner—J. D. Miller
Assistant Examiner—Robert J. Hickey
Attorney—Gottlieb, Rackman & Reisman

[57] ABSTRACT

A method and apparatus for rapidly charging a battery. During the charging process, the battery is caused to accept and store the desired charging current by producing discharge pulses whose rate and/or durations vary in accordance with the relative magnitudes of the charging current and the acceptance current level of the battery.

2 Claims, 15 Drawing Figures

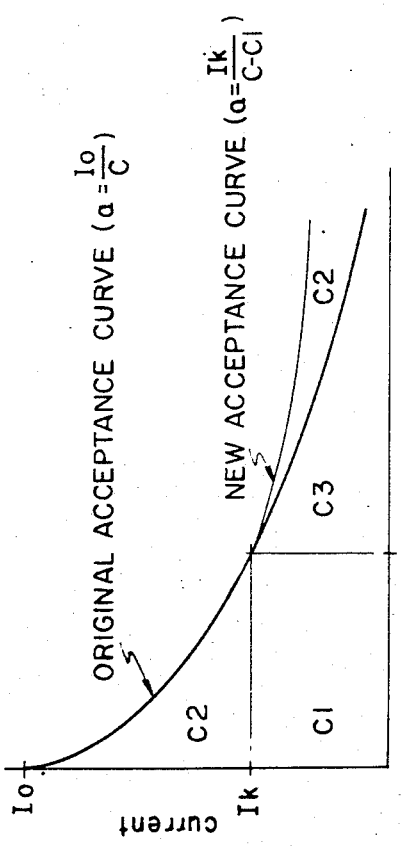
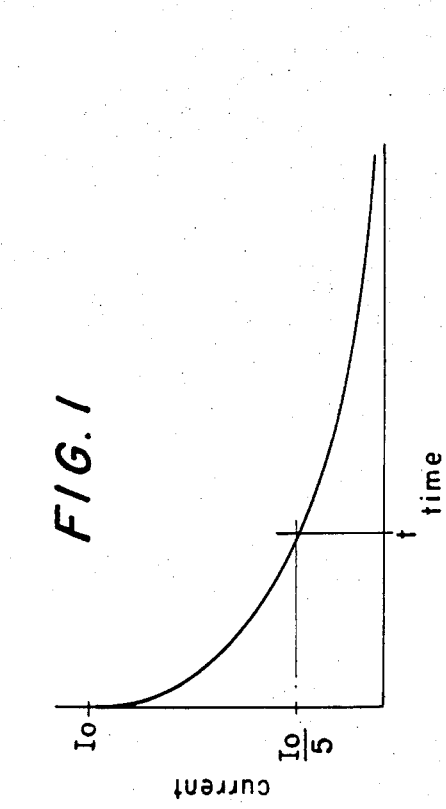
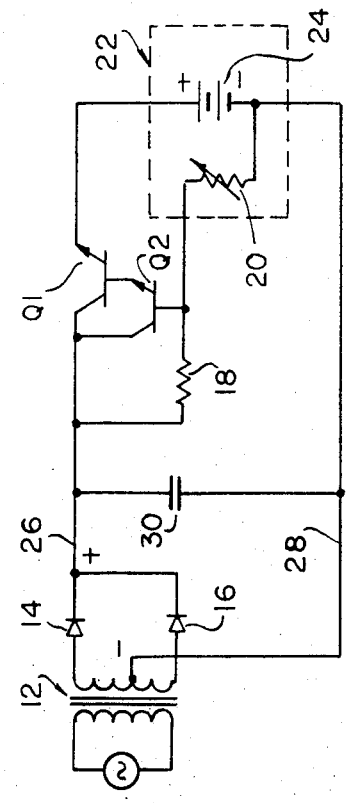
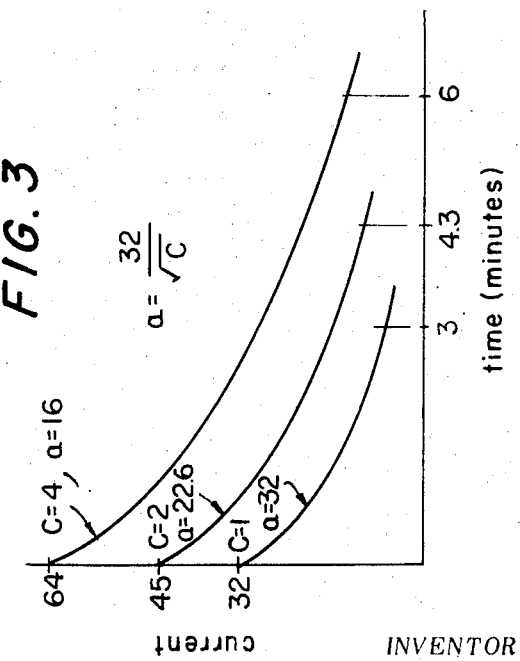

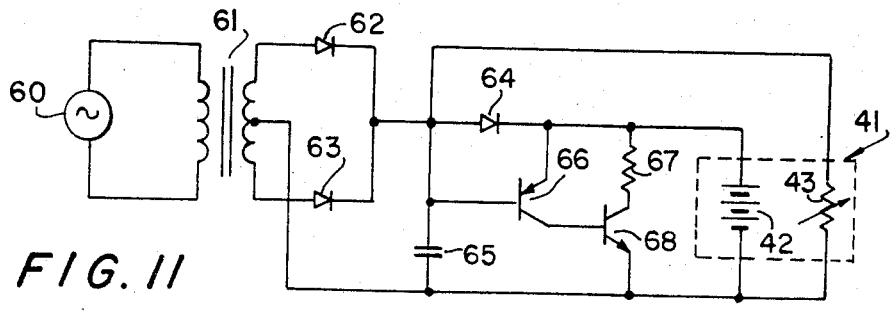
FIG. 11
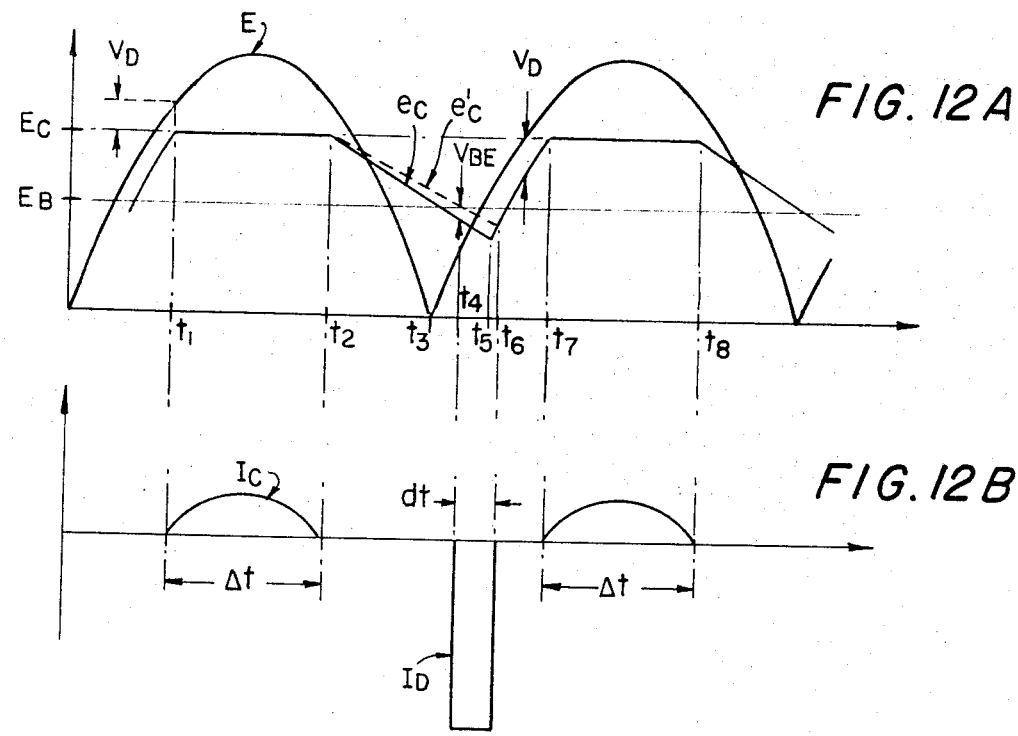
FIG. 12A
FIG. 12B
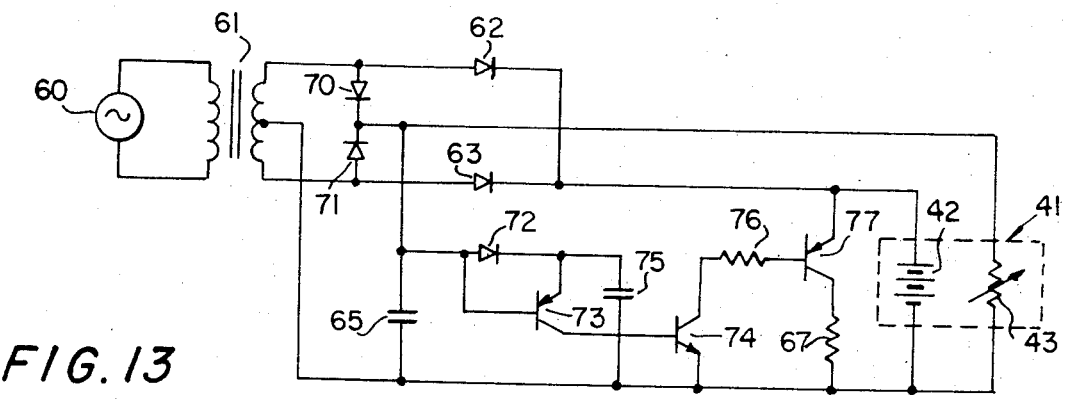
FIG. 13
INVENTOR.
JOSEPH A. MAS
BY Amster & Rothstein
ATTORNEYS

METHOD AND APPARATUS FOR CHARGING BATTERIES

This invention relates to methods and apparatus for charging batteries, and more particularly to methods and apparatus for controlling fast charging of batteries.

Although battery chargers have been marketed for many decades, very little theoretical work has been done concerning the actual charging processes. For the most part, battery chargers (including those used in automobiles) have been designed on an empirical basis.

The concept of battery "acceptance" is described in the SAE (Society of Automotive Engineers) Journal, June 1969, Vol. 77, No. 6, pp. 31-33. The "acceptance" of a battery is a measure of its ability to accept and store a charge. If a charging current is supplied to a battery which is greater than the acceptance current, the excess current will not be stored but will instead result in the gassing of the electrolyte in accordance with Faraday's Laws. The acceptance current decreases exponentially as charging progresses. Therefore, to rapidly charge a battery without producing gassing, the charging current should decrease exponentially as a function of time and should follow the acceptance current curve.

Most charging systems in present day use are of two types, neither of which is capable of charging a battery without undercharging or overcharging it. In the first type of charging system, the battery is supplied with a constant charging current. As the battery acceptance current falls below the charging current, the battery is "overcharged" and gassing occurs. In the second type of system in present day use, the charging current decreases as the battery voltage increases during the charging process. However, the voltage at which a battery becomes fully charged varies with the temperature and age of the battery. Thus, if the battery becomes fully charged at a voltage lower than that of the charging current source, charging current will continue to flow and the battery will be overcharged. On the other hand, if the battery voltage when it is fully charged is higher than the voltage of the charging current source, charging will be terminated before the battery is fully charged and the battery will be left in an undercharged condition. Overcharging and undercharging are the main causes of battery failure.

In both types of systems in present day use, charging is also inefficient from a time standpoint since the current levels used are much lower than the initial high acceptance current level of the battery.

In the system described in my above-identified article, a pressure transducer is provided to sense the gas pressure developed in the battery. The rate at which gas is generated in the battery is a measure of excess charging current (above the acceptance level). The signal developed by the transducer is used to control the charging current so that it follows the acceptance curve. By providing a feedback system, the gassing can be kept so low as to have no deleterious effect on the battery, while at the same time the charging current can be made to follow the acceptance current curve for rapid charging. With use of such a system, it is possible to charge an automobile battery to 80 percent of its full charge in less than half an hour.

However, it is apparent that even faster charging could very well revolutionize many industries. The most obvious application of fast battery charging systems is in the automotive field. Fast charging systems would make "electric cars" practical for everyday needs. While the batteries of an electric car might allow the car to be driven for only a few hours before the batteries would have to be recharged, it is apparent that this would be no drawback if all that would be required would be for the driver to pull up to a service station and get a "quick charge" in several minutes.

It is a general object of my invention to provide a method and apparatus for charging batteries at rates which are significantly faster than those of the prior art.

The basic technique of my invention for speeding up the charging process is to discharge the battery periodically during the charging (and even before the charging begins). The periodic discharge of a battery during the charging process in order to speed up the charging has been suggested in the prior art. But the effect of the discharge pulses has not been fully understood. The design of battery chargers which periodically discharge a battery for short intervals has taken a trial-and-error approach. Because the effect of the discharge pulses has not been fully understood, maximum speed in battery charging has not yet been achieved.

I have discovered what I believe to be three fundamental laws relating to battery charging. Relying on these laws (to be described in detail below), it is possible to design battery charging systems which are capable of charging batteries in significantly reduced time periods.

A rapid-charging system has recently been marketed by the McCulloch Corporation. The system is described in the Sept. 22, 1969 issue of Product Engineering, pp. 94-95. In the McCulloch system, the battery is periodically discharged for brief intervals during the charging process. The rate of the discharge pulses varies slightly in accordance with the battery voltage (the battery voltage increases during charging). But, except for variations in the battery voltage, the discharge pulses in the McCulloch system occur at times which are basically independent of the needs of the battery. While the discharge pulses allow the battery to be charged at a faster rate, they are not controlled by the needs of the battery. Because of this, the McCulloch system is not capable of charging a battery in the shortest possible time. In fact, in the McCulloch system the battery is actually discharged (thereby lengthening the total charging time) at times when the discharge pulses do absolutely no good.

In accordance with the principles of my invention, the charging current is made to follow the acceptance current of the battery as described in my above-identified article. It would appear that because the acceptance current curve decreases exponentially as charging progresses, while the charging current can be quite large at the start of the charging process it must be quickly controlled to decrease in order that it not exceed the acceptance current and in so doing cause the battery to gas. However, I have discovered that each discharge pulse causes the acceptance current of the battery to increase. This means that following a discharge pulse, the charging current can be kept at a high level without causing the battery to gas. Moreover, I have discovered what I believe are laws which accurately characterize exactly how a discharge pulse increases the acceptance current of a battery. Based on these laws, I provide a method and apparatus for charging a battery in which discharge pulses are caused to occur as a function of the needs of the battery, that is, only when they can do some good (to increase the acceptance level, when it is below the charging level).

It is a feature of my invention to monitor the acceptance current of a battery (by monitoring the rate of gas generation in the illustrative embodiments of the invention), and to briefly discharge the battery at a high rate when it is necessary to increase the acceptance current level relative to the level of the charging current.

Further objects, features and advantages of my invention will become apparent upon consideration of the following detailed description in conjunction with the drawing, in which:

FIG. 1 depicts a typical acceptance current curve of a battery;

FIG. 2 depicts how the acceptance current curve of the battery changes when the battery is initially charged by a current below the original acceptance curve;

FIG. 3 depicts a family of acceptance current curves for a battery initially discharged to different depths;

FIG. 4 depicts an illustrative circuit for charging the battery as taught in my above-identified article, that is, simply maintaining the charging current approximately equal to the acceptance current as the latter continues to decrease;

FIG. 11 depicts another illustrative system for charging a battery in accordance with the principles of my invention;

FIGS. 12A and 12B depict waveforms which will be helpful in understanding the operation of the circuit of FIG. 11; and FIG. 13 depicts another battery charging circuit which is a "fail-safe" version of the circuit of FIG. 11.

Figure 5:
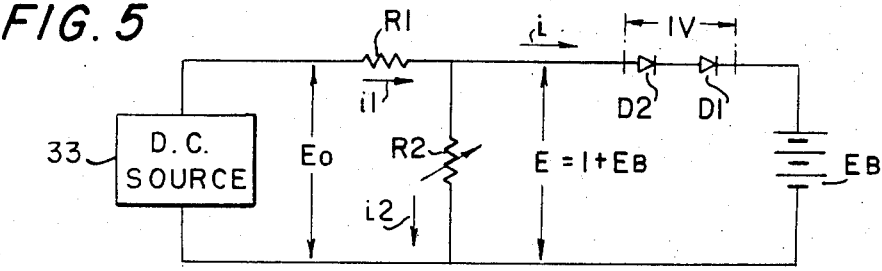
FIG. 5 is an equivalent circuit which will be helpful in understanding the operation of the circuit of FIG. 4.

The "acceptance" of a battery is a measure of its ability to accept a charge. Any charging current above the acceptance level of the battery will result in the generation of gas. By holding the gassing level constant at a very low value, the acceptance current at all times during the charging process can be measured. As the battery is charged, its acceptance current decreases.

If a battery is discharged by an amount equal to C ampere-hours and is then charged such that the charging current is at all times the maximum possible value which does not produce gassing, that is, the charging current is made equal to the acceptance current, it is found that the charging current (the acceptance current) starts at a level of $I_o$ and goes down exponentially. The charging current $i$ at any time $t$ is:

$$i = I_o e^{-at} \quad (1)$$

where $a$ is the acceptance ratio determining the rate of decay. The charge ($c$) stored at any time $t$ after the start of charging is the integral of the current over the time period $t$:

$$c = \int_0^t i\, dt = \int_0^t I_o e^{-at} dt$$

$$c = (I_o/a)(1 - e^{-at}) \quad (2)$$

From equation (2) it is apparent that the final increase in total charge (C), when $t = \infty$, is:

$$C = I_o/a$$

so that $$a = I_o/C \quad (3)$$

The acceptance ratio $a$ is therefore the ratio between the initial acceptance current and the charge $C$ to be put back into the battery. The higher the acceptance ratio $a$, the higher the initial charging current $I_o$ and therefore the faster the charging.

Consider now the time required to reach a given percentage of charge. For an 80 percent charge delivery, the factor $e^{-at}$ in equation (2) must equal 0.2 so that $at = 1.61$, where $t$ is measured in hours, or $at = 96.6$, where $t$ is measured in minutes. Thus the time in minutes to put back 80 percent of the charge is:

$$t = 96.6/a \quad (4)$$

Substituting the value of 0.2 for the exponential term in equations (1) and (2), $$i = I_o/5, \text{ at } t = 96.6/a$$

$$c = 0.8(I_o)/a, \text{ at } t = 96.6/a$$

Thus by the time an 80 percent charge is had, the acceptance current decays to 1/5 of its initial value.

FIG. 1 shows the decay of the charging current (assuming that, for fastest charging without gassing, it is kept equal to the acceptance current) as charging progresses to the 80 percent level in the time $t$. The charge delivered is equal to the area under the curve from time = 0 to time = $t$.

Consider now the charging process when the initial charging current is less than the initial acceptance current. FIG. 2 shows the charging process under these conditions. Charging proceeds at constant current $I_k$ until the acceptance curve is met at time = $t_1$. During this time a charge $C_1$ corresponding to the rectangular area $I_k \times t_1$ is delivered to the battery. Charge $C_2$ is not delivered to the battery during time $t_1$ as it would be were the charging current to start at level $I_o$ and decrease exponentially.

Beyond time $t_1$, charging proceeds along a new exponential curve with a lower acceptance ratio. During this additional time, charge $C_2$ will be delivered along with the remaining portion $C_3$. Any attempt to accelerate the charging process by increasing the charging current will only result in increased gas generation.

At time $t_1$, the new acceptance curve has an acceptance ratio $a = I_k/(C-C_1)$. This is determined from equation (3); the maximum charging current which will not produce gassing is $I_k$ since at time $= t_1$, the initial acceptance curve has a value of $I_k$, and the charge yet to be delivered (the discharge at this point) is $C-C_1$.

In FIG. 2 a new acceptance curve is shown starting at time $=t_1$. This is due to the fact that at this time $I_o$ and $C$ in equation (2) have both changed from their initial values.

The acceptance ratio $a$ of equation (1) is a constant, and when the charging current follows the acceptance current curve from the start of the charging, the acceptance ratio of the battery remains constant. Not only does $a$ equal $I_o/C$, where $I_o$ is the initial acceptance current and $C$ is the total charge to be stored, but $a$ is also equal to $i/c$, where $i$ is the charging (acceptance) current at any time and $c$ is the charge left to be stored at the same time. This can be shown as follows:

$$i = I_o e^{-at},$$

from equation (1)

$$c_{stored} = I_o/a\,(1-e^{-at}),$$

from equation (2)

$$c_{left\ to\ be\ stored} = C - c_{stored} = (I_o/a) - (I_o/a)(1-e^{-at})$$

$$= I_o/a\,(-e^{-at})$$

$$i/c_{left\ to\ be\ stored} = a = I_o/C$$

But even if the charging current does not follow the acceptance current curve, the original acceptance current curve still determines the maximum charging current at all times until the charging current curve intersects it. At this time a new acceptance curve determines the maximum charging current. The new curve has a lower acceptance ratio, that is, it is above the original curve. Were this not the case, charge $C_2$ in FIG. 2 could never be delivered to the battery without gassing. If the new curve is followed by the charging current after time $= t_1$, there will be no gassing and charging will proceed at the fastest possible rate (although the "lost time", as a result of not following the original curve up to time $= t_1$, cannot be made up). If the new curve is not followed, eventually the charging current curve will intersect it at some time $t_2$. At this time, yet a third acceptance curve, with a still lower acceptance ratio, governs the charging.

Thus the original acceptance curve (which, as will be shown below, is determined by the previous discharge) has the utmost significance in determining the total time required to charge the battery. Each subsequent acceptance curve (determined by the previous acceptance curve and the charge remaining to be supplied) has a similar governing role. In effect, the battery has a "memory" which is not affected by the particular shape of the charging current waveform.

In the event a constant charging current $I_k$ is used as shown in FIG. 2, there is some value for $I_k$ which will yield a maximum charge $C_1$ within the original acceptance curve. The total charge by the time $t_1$ when the $I_k$ curve intersects the acceptance curve is $I_k t_1$. Also, at time $=t_1$, since $i=I_k$, from equation (1):

$$I_k t_1 = I_o t_1 e^{-at_1} \qquad (5)$$

The maximum value of $I_k t_1$ can be determined by differentiating the right side of equation (5) with respect to $t_1$, setting the derivative equal to zero and then solving for $t_1$, and finally substituting the value for $t_1$ in the equation. If this is done, it is found that for maximum charge with a constant current within the acceptance curve, $I_k = I_o/(ae) = 0.368\, I_o/a = 0.368C$.

It will be useful at this time to explore the charging process represented by FIG. 2 in terms of an actual battery. Consider a battery with 10 ampere-hours removed and having an acceptance ratio of $a = 10$. The maximum acceptance current $I_o$ will be, by equation (3):

$$I_o = Ca = 10 \times 10 = 100 \text{ amperes}$$

If it is desired to charge this battery to the 80 percent level in minimum time, charging can start at 100 amperes under acceptance control. The charging time by equation (4) will be 9.66 minutes.

If the initial charging current is less than 100 amperes the charging time will be extended. The total time consists of two components: $t_1$, the time required to intersect the acceptance curve, and $t_2$, the additional time required to reach 8 ampere-hours (the 80 percent level). The total charging time as well as the two components $t_1$ and $t_2$ are shown in he following table for various levels of constant starting currents $I_k$.

TABLE I

Total charging time for various levels of initial current $I_k$.
Capacity to be charged: 80 percent of 10 ampere-hours, original $a = 10$.

| $I_k$ | $t_1$(hours) | $t_2$ (hours) | Total Charging Time |
|---|---|---|---|
| 100 | 0 | 0.161 | 9.66 minutes |
| 80 | 0.023 | 0.144 | 10.0 minutes |
| 60 | 0.051 | 0.143 | 11.7 minutes |
| 36.8 | 0.100 | 0.198 | 17.8 minutes |
| 20 | 0.161 | 0.414 | 34.5 minutes |
| 10 | 0.230 | 1.04 | 1.27 hours |
| 5 | 0.300 | 2.46 | 2.76 hours |
| 2 | 0.390 | 7.04 | 7.43 hours |
| 1 | 0.460 | 14.8 | 15.3 hours |
| 0.5 | 0.530 | 30.9 | 36.2 hours |

As an example of the manner in which the data of Table I is determined, consider an initial charging current $I_k$ of 1 ampere; time $t_1$ is the time required to meet the acceptance curve at the 1-ampere rate. It is also the time needed for the acceptance current to decay to the 1-ampere level. From equation (1):

$$i = 100\, e^{-10t_1} = 1$$

$$t_1 = 0.46 \text{ hours} = 27.6 \text{ minutes}$$

Therefore, at the time the acceptance curve is met (at $i=1$ ampere), $(1)(0.46)$ or $0.46$ ampere-hours have been put into the battery.

This means that after $t_1$ hours there are $10 - 0.46$ or $9.54$ ampere-hours left to charge. Therefore the new acceptance ratio $a'$ (see FIG. 2) is:

$$a' = I/C = 1/9.54 = 0.105$$

The important point to note is that by not charging the battery at its maximum acceptance rate, its acceptance ratio has been lowered from 10 to 0.105; the equation for the new exponential curve is:

$$i = 1\ e^{-0.105t}$$

The original objective was to charge a battery having as an initial discharge of 10 ampere-hours to the 80 percent level, in other words, leaving 2 ampere-hours still to be charged. In order to do this with the battery now at the 0.46 ampere-hour level (9.54 ampere-hours left to charge), 8 −0.46 or 7.54 ampere-hours must be added. The percentage of charge will now be 7.54/9.54 or 79 percent. This means that in equation (2), $e^{-at}$ must equal 0.21, and $at = 1.56$. Since $a = 0.105$, $t$ ($t_2$ in Table I) is 14.8 hours. The total charging time, the sum of $t_1$ and $t_2$, is 15.3 hours.

Table I is of great interest for several reasons. First, it shows the importance of taking advantage of the high initial acceptance. Second, it shows the serious reduction in acceptance after an initial charge at low current. For example, after charging for a little under one-half hour at 1 ampere, the battery acceptance is reduced from its initial ratio of $a=10$ to $a=0.105$ and charging can no longer be accelerated by increasing the current level. Various ways of increasing battery acceptance, both prior to and during the charging process, will be described below.

The acceptance ratio $a$ in terms of a battery construction, capacity, depth of discharge and rate of discharge, will now be considered. I have found that the acceptance ratio is characterized by three "laws".

*Law I: For any given discharge current, the acceptance ratio of a battery varies inversely as the square root of the capacity removed.*

This first law can be expressed as follows:

$$a = K/\sqrt{C}, \quad K = \text{constant}$$

Therefore, from equation (3):

$$a^2 C = aI_o = K \qquad (6)$$

If equation (1) is differentiated, it is found that the initial slope (at $t=0$) is $(di/dt) = -aI_o$. Since from equation (6), $-aI_o = -K$, it is expected that a family of curves of constant initial slope will be observed for the charging current after various depths of discharge $C$. This is shown in FIG. 3 for a cell having an acceptance ratio of 32 at 1 ampere-hour discharge.

The following table tabulates the performance of the battery depicted in FIG. 3:

TABLE II

| Capacity Removed | Acceptance | Charge time to 80% |
|---|---|---|
| 0.5 AH | 45.2 | 2.14 minutes |
| 1 AH | 32 | 3.02 minutes |
| 2 AH | 22.6 | 4.27 minutes |
| 4 AH | 16 | 6.03 minutes |
| 8 AH | 11.3 | 8.54 minutes |

The "charge time" in each case is determined from equation (4).

*Law II: For any given depth of discharge, the acceptance ratio of a battery is proportional to the logarithm of the discharge current.*

This second law can be expressed as follows:

$$a = K \log KI_d,$$

where $I_d$ is any constant current at which the battery was discharged.

Laws I and II together define the acceptance ratio of a battery. Thus, $$a = (K' \log kI_d)/\sqrt{C}.$$

In an experiment performed with the battery depicted in FIG. 3, the acceptance ratio was 32 when the discharge was at 10 amperes, and the ratio was 16 when the discharge was at 1 ampere. Both discharges were to a depth of 1 ampere-hour. The complete acceptance equation for this battery is therefore:

$$a = (16 \log 10\ I_d)/\sqrt{C} \qquad (7)$$

It is of considerable interest to tabulate equation (7) for various rates of discharge keeping the depth of discharge ($C$) constant. The following table shows the acceptance $a$ for different discharge currents at a constant discharge of 1 ampere-hour. Also listed is the initial acceptance current $I_o$ which is the product of $a$ and $C$ (from equation (3)):

TABLE III

| $I_d$ | $a$ | $I_o$ | Charge time to 80% |
|---|---|---|---|
| 1 | 16 | 16 | 6.03 minutes |
| 5 | 27 | 27 | 3.58 minutes |
| 10 | 32 | 32 | 3.02 minutes |
| 50 | 45 | 45 | 2.15 minutes |
| 100 | 48 | 48 | 2.01 minutes |
| 300 | 56 | 56 | 1.72 minutes |

It is apparent that the ability to charge a battery depends on its discharge history, specifically, on its depth of discharge and its rate of discharge. A battery discharged for a long time at a very low rate has a low charge acceptance. Conversely, a battery discharged at a high rate for a short time can be charged very quickly.

The third law I have discovered relates to a battery discharged at several different rates.

*Law III: The acceptance current of a battery discharged at several rates is equal to the sum of the acceptance currents for each of the several rates.*

This third law can be expressed as follows:

$$I_t = I_1 + I_2 + I_3 + I_4 + \qquad (8)$$

where $I_t$ is the (total) acceptance current and $I_1$, $I_2$, etc. are the acceptance currents resulting from the individual discharges. Similarly, it follows that $$a_t = I_t/C_t \qquad (9)$$

where $C_t$ is the total capacity discharged and $a_t$ is the total battery acceptance ratio.

Since each individual acceptance current is the product of the respective acceptance ratio and capacity discharged, and from TABLE III each acceptance ratio increases with the discharge current, it is seen that a battery's acceptance (speed of charging) can be increased by further discharging it at a high rate both prior to and during the charging process.

It is convenient to modify equation (7) by multiplying both sides by $C$:

$$aC = I_o = \sqrt{C}\ 16 \log 10 I_d \qquad (10)$$

This form of the equation will be helpful in the following analysis.

Consider the same battery whose charge characteristics are defined by equations (7) and (10) and TABLE III, and discharge it a total of 9 ampere-hours at a rate of ½ ampere. From equation (10) it is found that $I_o= 33.6$ and $a = 3.73$. Also, from equation (4), $t=25.9$ minutes (for an 80 percent charge).

Suppose now that prior to charging the battery is discharged an additional 1 ampere-hour at 500 amperes. This can be done in 7.2 seconds. The acceptance current for the new discharge will be 59.2 amperes (from equation (10)). From equation (8) the new total acceptance current will be the sum of 33.6 and 59.2 or 92.8 amperes. From equation (9), the new acceptance of the battery will be 92.8/10 or 9.28. From equation (4), it is now found that the time required to charge to the 80 percent level has been reduced to 10.4 minutes, plus the 7.2 seconds required for the additional discharge. The latter, of course, is negligible.

It is apparent that a battery can be conditioned to favor a fast charge by additional periods of high discharge rates. From equation (7) it is evident that the additional discharge should be at the highest rate possible. The highest rate, of course, will be under short-circuit conditions when the discharge current will be limited only by the battery's internal resistance. By changing the acceptance ratio of a battery during the charging process, charging need not proceed exponentially at a constant acceptance ratio. It is possible to control both the shape of the charging current and its magnitude at any time. In short, both the acceptance current and the acceptance ratio can be increased by a small discharge at a high rate prior to charging, and the acceptance current can be made to follow any desired curve by small, high-rate discharges during the charging process.

A high acceptance current does not mean per se that the battery can be charged quickly. The speed of charging actually depends on the acceptance ratio, which should be high for fast charging. Since $I_o = aC$, it is apparent that not only should $I_o$ be "high", but that it should be high in relation to the capacity left to be charged. In other words, $I_o/C$ must be high for fast charge.

The reason a battery can be charged faster after an additional high-rate discharge is that more is added to the numerator (acceptance current, $I_o$) than to the denominator (capacity removed, $C$).

As described above, with exponential charging the acceptance ratio remains constant. This means that the ratio of the maximum current which will not produce gassing to the charge left to be stored remains constant. Also, the rate of completion in terms of percentage left to charge is constant. For example, if it takes 1 minute to charge to the 50 percent level, it will also take 1 minute to put in 50 percent of the remaining charge, another minute for 50 percent of the remainder, etc.

To produce an exponential charging curve, charging should start at the maximum initial acceptance current and follow the curve down. This can be done by monitoring the gassing level. FIG. 4 shows a simple circuit for accomplishing exponential charging.

An AC source of power is connected across the primary winding of transformer 12. The two ends of the secondary winding are connected respectively through diodes 14, 16 to conductor 26. Conductor 28 is connected to the center tap of the secondary winding. The diodes serve to rectify the input voltage so that a DC voltage appears across capacitor 30.

Current flows through transistor Q1 to charge battery 22. The battery is shown in dotted lines and includes a plurality of cells 24 and a pressure transducer 20 which may be of any well known type. Resistor 18 and resistor 20 are connected in series across capacitor 30 with the junction of the two resistors being connected to the base terminal of transistor Q2. The impedance of resistor 20 decreases as the gas pressure inside the battery increases.

As the pressure increases, the magnitude of resistor 18 increases relative to the magnitude of resistor 20, and the potential at the junction of the two resistors decreases. The base-emitter drive of transistor Q2 thus decreases, as does the emitter current of the transistor. Since the emitter current of the transistor flows into the base of transistor Q1, the current flowing through transistor Q1 similarly decreases.

Thus, if the gassing increases the charger current decreases. On the other hand, as the gassing level falls, more current flows through transistor Q1 so that the charging current can be made equal to the acceptance current. The use of pressure transducer 20 in the feedback circuit insures that the charging current is maintained equal to the acceptance current. The battery is vented to allow generated gas to escape.

The purpose of using two transistors, rather than only one, is that in the case of a 100-ampere charging current and a transistor having a current gain of 20, the base current is 5 amperes. This current, which flows through the pressure transducer, is relatively high. So that a smaller current will flow through the transducer, two stages of current amplification are provided. Assuming that both transistors have a current gain of 20, the current flowing through resistor 20 is only 5/20 or 0.25 ampere.

FIG. 5 is the equivalent circuit of FIG. 4 and will be helpful in fully understanding the charging sequence. Source 33, having a magnitude $E_o$ is the voltage which appears across capacitor 30 in FIG. 4. Resistor R1 represents resistor 18 and resistor R2 is the variable sensor resistor 20. The two diodes D1, D2 are the equivalents of the base-emitter drops of transistors Q1, Q2, and the voltage across the two junctions in series is assumed to be 1 volt. Although current $i$ flows into the base of transistor Q2, the current which actually flows into the battery is this current multiplied by the gain of the transistors. In the following analysis, it is assumed that the voltage $E_B$ of the battery remains fixed as it is charged.

As a particular example, consider a case in which the current gain is 1,000, $E_B = 7$ volts, $E_o = 12$ volts, and $R2 = 1,000$ ohms when there is no gassing. Furthermore, it is assumed that the maximum charging current ever required is 100 amperes. The maximum charging current flows in the absence of gassing, i.e., when $R2 = 1,000$ ohms. It is apparent from FIG. 5 that, $$i = i1 - i2 = (E_o - E)/(R1) - E/R2,$$

Due to the current gain of 1000, $i$ is only 0.1 percent of the charging current. Thus when $R2 = 1,000$ ohms, $i =$ 100/1,000 = 0.1 amperes. With these values, $R1$ can be determined from the equation for $i$:

$$0.1 = (12-8/R1) - 8/1,000, \quad R1 = 37 \text{ ohms}.$$

When $R2 = 1,000$ ohms, $i2 = 8/1,000 = 0.008$ amperes, and $i1 = (12-8)/37 = 0.108$ amperes. (This checks with the initial assumption that $i = 0.1$ amperes since $i1 - i2 = 0.1$ amperes $= i$.)

Since $i1 = 0.108$ amperes at all times, $i = 0$ when $i2 = i1 = 0.108$ amperes, or when $8/R2 = 0.108$ and $R2 = 74$ ohms.

With the value of $R1$ and the range of $R2$ now determined, consider a more specific case in which the initial charging current is 25 amperes and charging is stopped when the charging current drops to 4 amperes. The following values are computed from the equation derived above:

initial $i = 25/1,000 = 0.025$ amperes
final $i = 4/1,000 = 0.004$ amperes
initial $i2 = 0.108 - 0.025 = 0.083$ amperes
final $i2 = 0.108 - 0.004 = 0.104$ amperes
initial $R2 = 8/(0.083) = 96.4$ ohms
final $R2 = 8/(0.104) = 73.4$ ohms The percentage change in $R2$ is $(96.4 - 73.4)(100)/(96.4 = 24$ percent. This requires an increase in the gassing rate of the same amount. Of course, since the initial gassing rate is low to begin with (by using a sensor $R2$ which requires very little pressure input), the 24 percent increase in the gassing rate has a negligible effect on the battery performance.

It is apparent that the quickest way to charge a battery would be at a high constant current level, provided that the constant current can be accepted by the battery during the charging process. In terms of hardware design, constant current acceptance charging would also be the most economical. The charger capacity would have a 100 percent utilization during the entire charging process. No other charging curve can do this.

It will be helpful at this point to analyze an illustrative example. Consider a battery with 10 ampere-hours removed and having an initial acceptance ratio $a$ of 10. This means that the initial charging current $I_o$ will be 100 amperes. Following its exponential acceptance curve, the battery can be charged to the 80 percent level in 9.66 minutes (equation (4)). Similarly, it can be charged to the 90 percent level in 13.8 minutes.

With constant current charging, however, it could be charged to the 90 percent level in 9/100 hours, or 5.4 minutes. Thus with the same initial current (and same charger current capacity) constant current charging can be 2.56 times faster than exponential charging.

Consider now what would be required in order to make the battery accept this constant 100 amperes as it charges from 0 to 9 ampere-hours in 5.4 minutes. The acceptance ratio can no longer be constant; it would have to vary as follows:

Initial acceptance $= 100/10 = 10$
At the 50 percent charge level: $a = 100/5 = 20$
At the 90 percent charge level: $a = 100/1 = 100$ It is interesting to note the relationship between exponential and constant current charging. Constant acceptance ratio yields an exponential current curve. Conversely, constant acceptance current requires a rise in acceptance ratio which has the general shape of an exponential function. (The function is not truly an exponential.) This can be shown as follows. With a constant charging current I, after time $t_x$, $It_x$ ampere-hours have been stored. The charge $C_x$ which must yet be stored at time $t_x$ is thus: $C_x = C - It_x$. The acceptance ratio at time $t_x$ is $I/C_x = I/(C - It) = a$. Transposing, $$a = 1/(C/I - t_x) = 1/(1/a_o - t_x) \qquad (11)$$

where $a$ is the initial acceptance ratio. With constant current charging, the acceptance ratio must approach infinity as charging nears the 100 percent level. It will always be 10 times higher than the initial value at the 90 percent level.

Figure 6A:
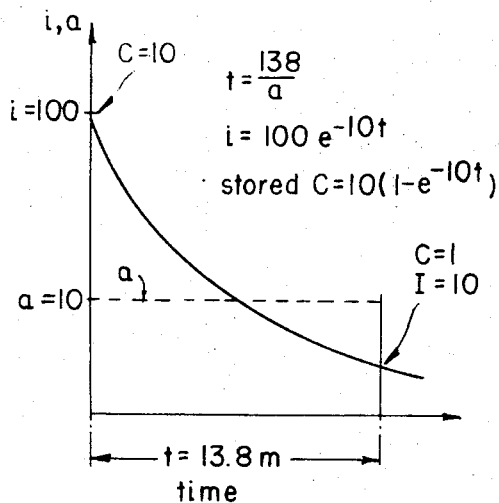
FIGS. 6A and 6B depict acceptance current curves and "acceptance" curves for batteries charged in two different manners.
Figure 6B:
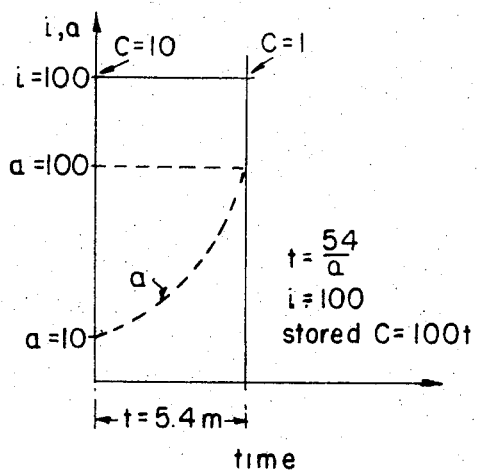

FIGS. 6A, 6B depict the exponential and constant current charging curves, together with their principal characteristics.

FIG. 6A depicts a charging current which follows the exponential acceptance current curve. Assuming that at the start of the charging process, $C=10$, and $I_o = 100$, from equation (3), $a = 10$. As described above, with exponential charging, the acceptance ratio remains constant. Consequently, the curve for $a$ is shown as a straight line in FIG. 6A.

Using the value 10 for $a$, and the value 100 for $I_o$, from equation (1) the current exponential waveform is as shown in the drawing: $i=100e^{-10t}$. Similarly, the value of $c$, the charge stored after any time $t$, is from equation (2): $c=10(1-e^{-10t})$. After charging has reached the 90 percent level, $c=9$, and the charge remaining to be stored ($C$) is 1 ampere-hour. From the equation for the charge stored, when $c=9$, $t=13.8$ minutes. Thus as shown in FIG. 6A, it takes 13.8 minutes to charge the battery to the 90 percent level.

In FIG. 6B, on the other hand, the charging current is constant at the 100-ampere level rather than exponential. As described above, in such a case the value of $a$ must increase as a function of time in accordance with equation (11). Charging for 1/10 hour with a current of 100-amperes would produce a charge of 10 ampere-hours. If charging is to proceed only to the 90 percent level, the charging takes 90 percent of this time, 9/100 hours or 5.4 minutes. Consequently, with constant current charging, the same charge is stored in the battery in 5.4 minutes rather than 13.8 minutes.

Figure 7:
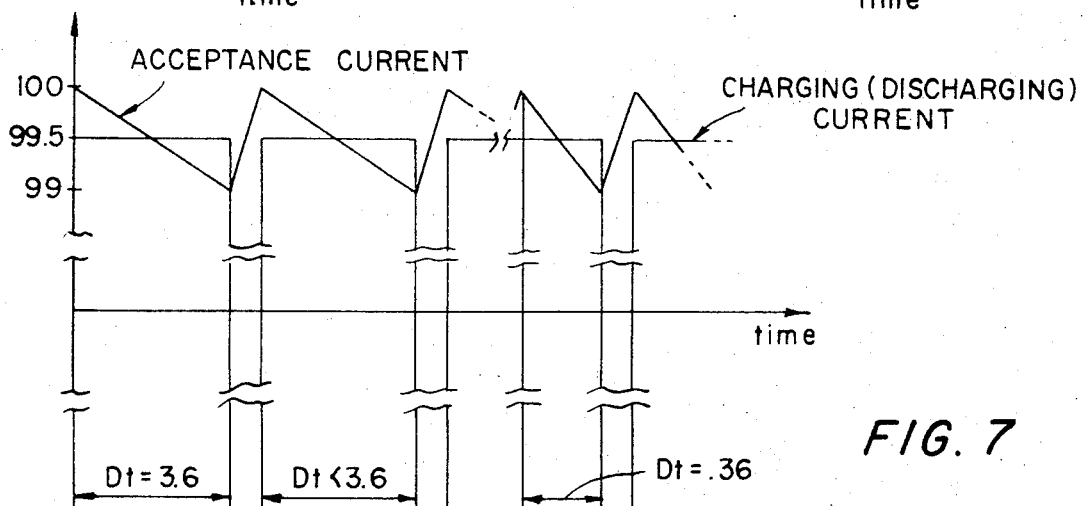
FIG. 7 depicts the manner in which a battery is charged in accordance with the principles of my invention.

In the case of constant current charging, to avoid excessive gassing the charging current should have a value less than $I_o$. The acceptance current decreases exponentially and thus falls below the constant charging current after some small time interval. To avoid excessive gassing, the acceptance current should not fall too far below the charging current. If a maximum drop in acceptance current of 1 percent is to be allowed, for example, in a time interval $Dt$, then at the end of the interval the battery can be discharged (at a high rate) in a small interval $dt$ to increase the acceptance current value to the initial $I_o$ level. In the example under consideration, $I_o = 100$ amperes and $a = 10$. FIG. 7 shows the acceptance current decreasing from 100 amperes to 99 amperes in $Dt$ seconds at the start of the charging process. (The decay is exponential.) The charging current is constant at 99.5 amperes. However, after $Dt$ seconds have elapsed and the acceptance current is 0.5 amperes below the charging current, the charging current is shut off. Instead, the battery is discharged at a high rate (shown by a current of reverse polarity) for $dt$ seconds; the acceptance current rises to the 100-ampere level during the discharge.

From equation (1), $$99 = 100e^{a(Dt)}$$

$$a(Dt) = 0.01 \text{ hours} = 36 \text{ seconds} \quad (12)$$

$$Dt = 36/a \text{ seconds}$$

$$Dt = 36/10 = 3.6 \text{ seconds}$$

It must be recalled that $a = I_o/C$. $I_o$ is essentially constant throughout the charging process. But $C$ decreases as the battery charges. At the 50 percent point, where the battery only has "half to go", $a = 20$. At this point, $Dt = 36/20 = 1.8$ seconds. At the 90 percent point (typically, where charging is ended), $C$ is only 10 percent of its initial value and $a = 100$. Thus, $Dt = 36/100 = 0.36$ seconds.

Since every $Dt$ interval ($Dt$ constantly decreasing from cycle to cycle) is followed by a discharge interval of $dt$ seconds ($dt$ being constant because the same "-capacity" is always put back into the battery), it is apparent that the rate of the discharge pulses varies from $60/3.6 = 16.7$ pulses per minute at the start of charging to $60/0.36 = 167$ pulses per minute at the end of charging.

The discharge time interval $dt$ required to keep the acceptance current at its initial level can be computed as follows. In the selected example, one ampere is lost during time $Dt$. This amount must be put back by a high rate discharge during interval $dt$. From equation (10):

$$I = 1 = \sqrt{C} \, 16 \log 10 \, I_d$$

The maximum short-circuit discharge current of dbattery tested was 300 amperes ($I_d = 300$). Solving for $C$:

$$C = 1/(16 \times 3.478)^2 = 3.22(10^{-4}) \text{ ampere-hours}$$

The capacity restored ($C$) is ($I_d$) ($dt$), and since $I_3 = 300$ amperes, $$dt = 3.22(10^{-4})/300 = 1.07 \times 10^{-6} \text{ hours} = 3.87 \text{ milliseconds}.$$

(13)

The discharge pulse interval $dt$ required to keep the acceptance current at the initial value is very small compared to the charging interval $Dt$ which varies from 3.6 seconds to 0.36 seconds.

The number of discharge pulses occurring during the charging process can be obtained by integrating the discharge current with respect to time to obtain the total discharge ampere-hours, and then dividing this value by the ampere-hours in one discharge pulse.

During the charging to the 90 percent level, $dt$ (which is a constant) is always smaller than the smallest $Dt$. Therefore, the average discharge current over any complete cycle ($Dt + dt$) is:

$$\hat{I}_d = [300(dt)]/[(Dt+dt)] \cong 300(dt)/(Dt)$$

From equations (12) and (13):

$$\hat{I}_d \cong 322(10^{-6})/0.01/a$$

Since, from equation (11), $(1/a) = 0.1 - t$, $$\hat{I}_d \cong 0.322/(1 - 10t)$$

The total discharge ampere-hours =

$$\int_{t=0}^{t=.09 \text{ hours}} \hat{I}_d dt = .322 \int_{t=0}^{t=.09 \text{ hours}} \frac{dt}{1 - 10t}$$

$$= .074 \text{ ampere-hours}.$$

The total number of discharge pulses is thus $(0.074)/1.07 10^{-6})(300) = 231$, and the total discharge time is $(231)(3.87 \times 10^{-3}) = 0.883$ seconds.

The preceding analysis of constant current charging is an approximation. It assumes that the net charging current into the battery is constant during the entire charging period. (See FIG. 6B; the total charging time of 5.4 minutes was derived based on an assumption of constant charging current.) Actually, the net charging current is the difference between the average charging current and the average discharge current, both of which vary with time. The following is a more precise analysis.

With a constant current of 100 amperes flowing from the charger during every $Dt$ time interval, the average value of the current from the charger over any cycle $(Dt + dt)$ is:

$$\hat{I}_c = 100(Dt)/(Dt+dt) \quad (15)$$

Similarly, there is an average discharge current over the interval $(Dt + dt)$ caused by the 300-ampere discharge pulse during the interval $dt$ of:

$$\hat{I}_d = 300(dt)/(Dt+dt) \quad (16)$$

It will be useful to modify the above relationships in terms of the charging progress. Let $C$ be the capacity left to charge at the start of any $(Dt + dt)$ interval. Then, by definition, the acceptance ratio at any time is:

$$a = I_o/C = 100/C$$

(The value of $a$ is constant during the interval since the charging is exponential.) From equation (12), $(a)(Dt) = 0.01$ ($Dt$ in hours). Therefore: $Dt = 10^{-4}C$ hours. Substituting this value for $Dt$ and the value of $dt = 1.07 \times 10^{-6}$ hours in equations (15) and (16):

$$\hat{I}_c = 100C/(C + 0.0107) \quad (17)$$

$$\hat{I}_d = 3.21/(C + 0.0107) \quad (18)$$

Thus $\hat{I}_c$ starts out at approximately 100 amperes and stays fairly constant until charging approaches completion. At the 90 percent level when $C = 1$, $\hat{I}_c = 99$ amperes. By contrast, $\hat{I}_d$ starts out at less than 0.32 amperes and increases as charging nears completion. At the 90 percent level it is 3.18 amperes.

As charging progresses beyond the 90 percent level, $\hat{I}_c$ decreases rapidly and will eventually equal the rapidly increasing $\hat{I}_d$. At this point, the net battery current is zero and no further charging can take place. From equations (17) and (18), when $\hat{I}_c = \hat{I}_d$, $100C = 3.21$ and $C = 0.0321$ ampere-hours. This is the charge left to be stored. Therefore, the charge stored ($C_s$) is:

$$C_s = 10 - 0.0321 = 9.968$$

Thus charging is automatically terminated when 99.7 percent completion is reached. Furthermore, this completion is approached with a relatively sudden drop in net charging current. By contrast, exponential charging approaches completion with zero change in net charging current so that it takes as long to go from 90 to 99 percent charge storage as it does to go from 0 to 90 percent.

This fast rate of completion can be demonstrated by solving for the net average charging current:

$$\hat{I}_n = \hat{I}_c - \hat{I}_d = (100C - 3.21)/(C + 0.0107) \quad (19)$$

Table IV depicts the charging process from its start to the time when the net charging current $\hat{I}_n = 0$, $C = 0.0321$. The Table is in terms of changes in $C$, and does not reflect changes in individual $(Dt+dt)$ intervals. The value of $\hat{I}_n$ for each specified change in $C$ represents the average net charging current over the interval during which the specified change in $C$ takes place. Although $\hat{I}_n$ is computed from equation (19) and is thus the average net charging current over the first $(Dt+dt)$ interval in the overall interval during which the specified change in $C$ occurs, a more accurate value for the average $\hat{I}_n$ over the overall interval is the average value of $\hat{I}_n$ at the start of the interval and $\hat{I}_n$ at the start of the next interval. The fourth column, Delta $C$, is the charge gained during each change in $C$, expressed in ampere-minutes. The time interval is the time in minutes needed by the net current to bring about the Delta $C$ of each step. The columns in sequence represent:

$C$ left: the $C$ in equation (19).

$C$ stored: total stored charge up to the beginning of each step.

$\hat{I}_n$: average net charging current in equation (19) during first $(Dt+dt)$ interval in each step.

Delta $C$: ampere-minutes gained during each step.

$\hat{I}_{navg}$: the average value of $\hat{I}_n$ during each step, computed by averaging the values of $\hat{I}_n$ at the beginning of two successive steps.

time int.: Delta $C/\hat{I}_{navg}$.

$t$: total elapsed charging time in minutes (sum of all time int. through end of step).

TABLE IV

| C left | C stored | $I_n$ | Delta C | $I_{navg}$ | time int. | Total elapsed charging time ($t$) time |
|---|---|---|---|---|---|---|
| 10 | 0 | 99.7 | | | | 0 |
| | | | 60 | 99.65 | 0.602 | |
| 9 | 1 | 99.6 | | | | 0.602 |
| | | | 60 | 99.55 | 0.603 | |
| 8 | 2 | 99.5 | | | | 1.21 |
| | | | 60 | 99.45 | 0.603 | |
| 7 | 3 | 99.4 | | | | 1.81 |
| | | | 60 | 99.35 | 0.603 | |
| 6 | 4 | 99.3 | | | | 2.41 |
| | | | 60 | 99.25 | 0.604 | |
| 5 | 5 | 99.2 | | | | 3.01 |
| | | | 60 | 99.15 | 0.605 | |
| 4 | 6 | 99.1 | | | | 3.62 |
| | | | 60 | 99.05 | 0.606 | |
| 3 | 7 | 99 | | | | 4.23 |
| | | | 60 | 98.5 | 0.609 | |
| 2 | 8 | 98 | | | | 4.84 |
| | | | 60 | 97 | 0.618 | |
| 1 | 9 | 96 | | | | 5.46 |
| | | | 30 | 94 | 0.319 | |
| 0.5 | 9.5 | 92 | | | | 5.78 |
| | | | 12 | 89.25 | 0.134 | |
| 0.3 | 9.7 | 86.5 | | | | 5.91 |
| | | | 6 | 83.25 | 0.072 | |
| 0.2 | 9.8 | 80 | | | | 6.00 |
| | | | 6 | 71 | 0.085 | |
| 0.1 | 9.9 | 62 | | | | 6.05 |
| | | | 3 | 46 | 0.065 | |
| 0.05 | 9.95 | 30 | | | | 6.13 |
| | | | 1.1 | 15 | 0.073 | |
| 0.032 | 9.968 | 0 | | | | 6.20 |

The Table shows that charging to the 90 percent level takes 5.46 minutes or 0.06 minutes more than that computed based on the assumption of a continuous charging current of 100 amperes (i.e., where the discharge intervals are not taken into account). The same corrected charging time can be arrived at by another line of reasoning. The integration showed that 231 pulses take place during the 5.4 minute charging time. During each $dt$ time interval, the net charging current which is lost is not only 300 amperes of discharge, but also the 100 amperes of charging current not delivered. The loss during each $dt$ interval is therefore 400 amperes $\times$ 1.07$\times$10$^{-6}$ ampere-hours, since each $dt$ interval is 1.07$\times$10$^{-6}$ hours. This amounts to 0.099 ampere-hours during the 231 pulses. In order to compensate for this, the 100 ampere flow must continue for an additional 0.06 minutes, in complete agreement with the Table.

Figure 8:
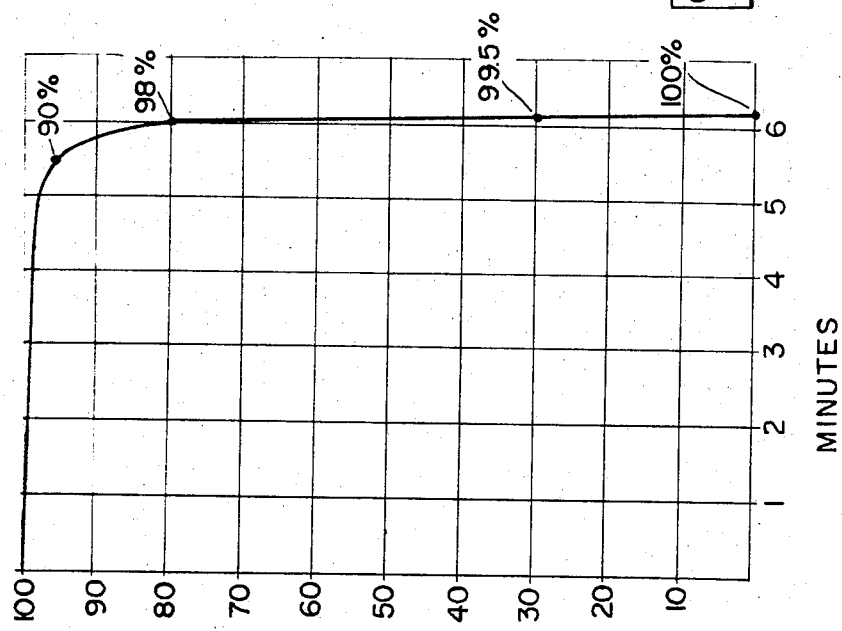
FIG. 8 is a plot of the average charging current delivered to a typical battery as a function of time in accordance with the principles of my invention.

FIG. 8 is a plot of the data in the chart. It shows clearly the sharp cut off of the current as charging nears completion. Unlike exponential charging, constant current acceptance charging makes it worthwhile to wait for charge completion.

It should be understood that, in the selected example of constant current charging by acceptance control, the charging process starts at the maximum possible current (the initial acceptance level) so that gas generation, and thus the discharge pulses, start almost immediately.

If the constant current selected is below the maximum initial acceptance current, in the same example less than 100 amperes, charging proceeds continuously and without pulses until the acceptance current decreases to the level of the charging current. From this point on, since gassing begins, the pulse rate goes up as in the selected example.

On the other hand, if the selected constant charging current is higher than the initial acceptance current of the battery, pressure due to gassing starts a high pulse rate in order to increase the acceptance of the battery to match the impressed charging rate. (The $Dt$ intervals are very short.)

It is clear that the charging system is self-correcting and self-adjusting. At no time is the net charging current appreciably higher than the battery's acceptance allows. Further, when the battery is fully charged the net charging current goes to zero.

Figure 9:
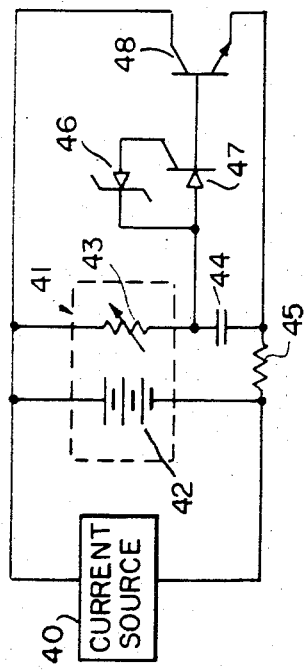
FIGS. 9 and 10 depict two illustrative systems for charging a battery in accordance with the principles of my invention.

FIG. 9 illustrates a circuit for automatically varying the $Dt$ intervals to produce a charging-discharging sequence of the type shown in FIG. 7. Battery 41 includes a plurality of cells 42 and a pressure transducer 43 whose resistance decreases with increasing gas pressure inside the battery. (The battery, of course, is vented to allow generated gas to escape; otherwise, the gas pressure would simply continue to build up and would result in very frequent discharges even though the battery acceptance does not require them.) Charging current source 40 can supply a current waveform of any desired shape, although for reasons given above it is preferably a constant-current source.

Capacitor 44 charges through pressure sensor 43 and resistor 45. It charges toward the voltage of battery 42. When the capacitor voltage rises sufficiently to break down Zener diode 46, the positive potential transmitted through the diode to the gate of SCR 47 causes the SCR to conduct. (The Zener diode breaks down when the voltage across capacitor 44 equals the breakdown voltage of the diode plus the junction drops of the SCR and transistor 48.) When the SCR conducts, current flows through it and the base-emitter junction of transistor 48. The transistor is thus turned on and current flows from cells 42 through the collector-emitter circuit of the transistor. (At this time, if the current source is not turned off, its current also flows through transistor 48.) Capacitor 44 discharges through the SCR and the transistor. After the capacitor has discharged sufficiently to turn the SCR off, transistor 48 turns off as well and current from source 40 once again flows into cells 42. Resistor 45 is provided to limit the discharge current from the battery to the desired value.

The duration of each discharge pulse ($dt$) is determined by the time required for capacitor 44 to discharge to that level which turns the SCR off. The impedance in the discharge path of the capacitor is that presented by the SCR and the transistor; the discharge time can be set simply by using an appropriate magnitude capacitor 44. The duration of the charging time ($Dt$) is determined by the product of the magnitude of capacitor 44 and the impedances presented by resistors 43, 45. (Resistor 45 is much lower in magnitude than resistor 43, even when the latter is at its minimum value.) When the magnitude of resistor 43 is very high, corresponding to zero gassing, the voltage across capacitor 44 does not build up to the firing level because whatever current is delivered to the capacitor cannot build up charge on the capacitor; the charge leaks off through the capacitor leakage resistance. As gassing develops and the magnitude of resistance 43 decreases, the increased current flow into capacitor 44 causes its voltage to build up and eventually to fire the SCR. Discharge pulses initially occur at a slow rate, but the rate eventually increases to a value at which the average charging current equals the average discharging current. At this point, as described above, the charging process is completed.

Figure 10:
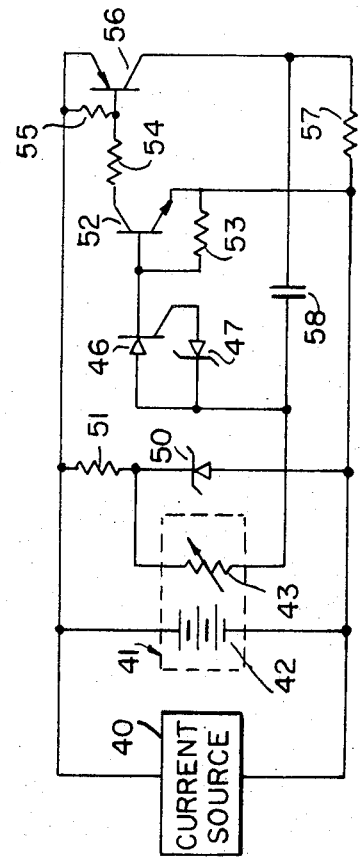

FIG. 10 illustrates a circuit which is different from that of FIG. 9 in two major respects. First, an additional transistor 56 is provided; the additional stage of amplification permits a larger magnitude discharge current to flow from the battery during the $dt$ intervals. Second, the voltage from which the timing capacitor charges is made independent of the battery voltage itself.

Resistor 51 and Zener diode 50 are connected in series across battery 41. The voltage at the junction of the Zener diode and the resistor is fixed and equals the Zener voltage. Resistor 43 is not connected to a battery terminal. The charging circuit (resistors 43 and 57, and capacitor 58) is thus connected across a source of fixed potential (Zener diode 50) rather than across the battery.

The voltage across a battery when it is being charged is equal to the internal electromotive force of the cells plus the "IR" drop across them, this drop being equal to the product of the charging current and the internal resistance of the cells. At the start of the charging process, the voltage of the cells starts to increase. Thus in the circuit of FIG. 9, at the start of the charging process the voltage across the charging circuit starts to increase. But toward the end of the charging process, when the average charging current approaches the average discharging current, that is, when the net current flow into the battery approaches zero, the "IR" drop decreases sharply. By this time, the voltage contribution of the cells has more or less steadied, and there is a sharp drop in the total voltage impressed across the charging circuit. At the end of the charging process, the discharge pulses should occur at a fast rate. But the drop in battery voltage tends to increase the time required for the timing capacitor to charge to the firing level of the SCR, that is, it tends to lower the rate of the discharge pulses. This, in turn, results in the net current into the battery dropping less sharply than it otherwise would. A sharp drop is desirable at the end of the charging process since it allows essentially constant charging until almost a full charge is obtained (see FIG. 8). Because the effective voltage source for the charging circuit in FIG. 10 is a fixed voltage, the rate of the discharge pulses toward the end of the charging process is not affected by the battery voltage, as it is in the circuit of FIG. 9.

When capacitor 58 charges to the firing level of Zener diode 47, SCR 46 in FIG. 10 turns on just as SCR 46 turns on in the circuit of FIG. 9. When the SCR conducts, transistor 52 turns on. Current flows through resistors 55, 54, and the emitter-base junction of transistor 56 is forward biased. This transistor turns on and allows the discharge current to flow through it and resistor 57. Resistor 57 serves the same purpose as resistor 45 in the circuit of FIG. 9 — it limits the discharge current to an acceptable level. (Resistor 57, like resistor 45 of FIG. 9, is of very small magnitude (for example, in the range 0.01–0.05 ohms), and may consist of a length of nichrome rod.) Elements 55 and 53 are low-magnitude resistors which prevent leakage currents from flowing through respective transistors 56, 52, a technique well known in the art.

In the practice of my invention, as the battery is progressively charged and the acceptance current decreases, it is necessary to periodically increase the acceptance current by discharging the battery. As the charging progresses, the rate of the increase in acceptance current continuously increases, that is, the rate of the discharge of the battery continuously increases, until eventually the average charging and discharging currents of the battery are equal. If some arbitrary time period is selected and the integral of the discharge current during this arbitrary time interval is considered, the value of the integral must increase during succeeding time intervals.

This can be accomplished in several ways. In the embodiments of the invention shown in FIGS. 9 and 10, all discharge current pulses have the same magnitude and the same width, but their rate of occurrence increases as charging progresses. It is also possible to utilize constant-width pulses which occur at a fixed rate, but to increase the magnitude of the discharge pulses as charging progresses. It is also possible to use constant-magnitude pulses which occur at a fixed rate, but to increase the width of the pulses as charging progresses. It is also apparent that combinations of these techniques can be used.

In the embodiment of the invention shown in FIG. 11, the discharge pulses occur at a fixed rate and are of a fixed magnitude, but the widths of the pulses increase as charging progresses.

An alternating current source 60 is connected across the primary winding of transformer 61. The two ends of the secondary winding are connected to respective one of diodes 62, 63, whose cathodes are connected through diode 64 to battery cells 42. The negative terminal of the cells is extended back to the tap on the secondary winding of the transformer. A full-wave rectified current is thus delivered through diode 64 to the battery.

Capacitor 65 is connected across the rectifier. If the voltage of the battery is $E_B$, then the voltage $e_C$ of the capacitor cannot exceed $E_B$ plus the drop across diode 64 (typically, a fraction of a volt). Although the voltage developed across the secondary winding of the transformer can exceed the maximum capacitor voltage, any excess voltage results in an internal "IR" drop in the secondary winding. If the maximum capacitor voltage is $E_C$, then as long as the voltage generated across the secondary winding of the transformer exceeds this level by the drop across one of diodes 62, 63, current flows through diode 64 to charge the battery. As soon as the rectifier voltage falls below $E_C$ plus the drop across one of diodes 62, 63 no current flows through the diodes. The capacitor starts to discharge through resistor 43 (the pressure transducer) which is connected across it. Diode 64 is reverse biased as soon as capacitor 65 discharges slightly since the cathode is held at a voltage of $E_B$ while the potential of the anode exceeds this voltage by less than the diode drop when it is conducting.

The potential of the emitter of transistor 66 is at a level $E_B$, while the base of the transistor is at a potential equal to the voltage across the capacitor. As the capacitor discharges through resistor 43, eventually the emitter-base junction of the transistor is forward biased sufficiently to cause the transistor to conduct. Current flows through the emitter-collector circuit of the transistor and is amplified by transistor 68. As soon as this latter transistor turns on, the battery discharges through the transistor and resistor 67, resistor 67 serving to limit the magnitude of the discharge current.

The cyclic operation is depicted in FIGS. 12A and 12B where FIG. 12A is a plot of various voltages as a function of time and FIG. 12B is a plot of the battery charging and discharging currents as a function of time. The waveforms are not drawn to scale (the magnitude of waveform E may be several hundred volts, while the difference between levels $E_B$ and $E_C$ is typically less than 1 volt).

The voltage E developed across the secondary winding of transformer 61, at the start of any cycle, is less than the voltage across capacitor 65. As the secondary winding voltage increases, eventually it is great enough to cause one of diodes 62, 63 to conduct. This occurs when voltage E exceeds the capacitor voltage by the forward drop across one of the diodes. One of the diodes conducts, and current is delivered from the rectifier to capacitor 65. The capacitor voltage $e_C$ is initially less than the battery voltage $E_B$ by more than the drop across diode 64. Consequently, diode 64 does not conduct and no current is delivered to the battery. The rectifier simply delivers current to capacitor 65 which charges. This is shown occurring prior to time $t_1$ in FIG. 12A; the capacitor voltage continuously increases and at all times is less than voltage E by the drop across the conducting one of diodes 62, 63, this drop being represented by magnitude $V_D$.

Eventually at time $t_1$, voltage E rises to a level $E_C + V_D$. At this time, the capacitor voltage $e_C$ equals level $E_C$, where $E_C$ is greater than $E_B$ by the drop across diode 64. Diode 64 conducts and charging current $I_C$ (FIG. 12B) is delivered to the battery. Once diode 64 starts to conduct, the voltage across capacitor 65 does not increase since it cannot increase above level $E_C$. Charging current continues to flow until voltage E eventually falls below $E_C + V_D$. At this time ($t_2$), the conducting one of diodes 62, 63 turns off. Each charging current pulse $I_C$ is of a fixed duration.

As soon as the conducting one of diodes 62, 63 turns off, capacitor 65 starts to discharge through resistor 43. No more current is delivered to the battery since diode 64 is reverse biased as soon as the capacitor discharges slightly. The capacitor continues to discharge until time $t_4$ when the voltage across it is less than the battery voltage by the base-emitter drop of transistor 66 when the transistor conducts, this drop being shown by magnitude $V_{BE}$ in FIG. 12A. As soon as the emitter voltage of the transistor (connected to the positive terminal of the battery) exceeds the base voltage (connected to the capacitor) by the forward drop across the base-emitter junction of the transistor, the transistor conducts and discharge current $I_D$ flows from the battery through resistor 67 and transistor 68.

The source voltage has by this time decreased to zero (at time $t_3$) and has started to increase again. The discharge current starts to flow at time $t_4$; after the discharge starts, voltage E continues to rise and voltage $e_C$ continues to decrease. Eventually, voltage E exceeds voltage $e_C$ by the forward drop ($V_D$) across one of diodes 62, 63. At the time, current flows from the source to start charging capacitor 65. The capacitor voltage starts to rise with the source voltage beginning at time $t_5$.

The discharge current continues to flow however because the base-emitter junction of transistor 66 is forward biased. As the capacitor voltage rises, eventually, at time $t_6$, it reaches a level below $E_B$ which is equal to the base-emitter drop of transistor 66. As soon as the capacitor voltage increases slightly above this level, the transistor turns off and the discharge current pulse terminates.

The capacitor voltage continues to rise along with voltage E, voltage E always being $V_D$ volts above it. Eventually, at time $t_7$, the capacitor voltage rises to level $E_C$ and another charging current pulse is delivered to the battery. At time $t_8$, voltage E falls below that level sufficient to sustain conduction of one of diodes 62, 63 and the capacitor starts to discharge once again.

Although the repetitive rate of the discharge pulses is fixed, the duration ($dt$) of each discharge pulse is variable. It is apparent from FIGS. 12A and 12B that the duration of the discharge pulse is a function of the rate at which capacitor 65 discharges through resistor 43 starting with time $t_2$ (or $t_8$). As the pressure inside battery 41 increases, the impedance of resistor 43 decreases. This results in capacitor 65 discharging at a faster rate. The slope of the discharge portion of the capacitor voltage curve increases and it is apparent that voltage $e_C$ falls below level $E_B$ (by $V_{BE}$ volts) earlier in each cycle. This causes the discharge current pulse to start earlier in each cycle and to thus increase the total discharge current by increasing its duration dt. (The discharge current pulse terminates at the same time during each cycle.)

On the other hand, when there is little gassing, the capacitor voltage decreases at a slower rate, the limiting case being shown by the dotted line $e'_C$. When the capacitor voltage decreases to level $E_B - V_{BE}$ just at time $t_6$, since it immediately starts to increase again, it is apparent that transistor 66 turns on and then immediately off again. There is thus no discharge current pulse. Of course, for slower discharges of capacitor 65, there are also no discharge current pulses generated.

A disadvantage of the circuit of FIG. 11 is that if the charging source malfunctions, capacitor 65 discharges through resistor 43 and is not charged again by the source. This in turn, results in transistor 66 turning on permanently and the complete discharge of the battery through transistor 68. The circuit of FIG. 13 is "fail-safe" in this regard in that a failure of the charging source does not result in the complete discharge of the battery.

In the circuit of FIG. 13, diodes 62, 63 are connected directly to the battery. Instead of providing diode 64 in series with the battery for the purpose of controlling conduction of transistor 66 after capacitor 65 has discharged sufficiently through resistor 43, diode 72 is provided to control a similar conduction of transistor 73. This diode is not connected to the battery. Instead, an additional capacitor 75 is provided. Also, an additional pair of diodes 70, 71 is provided for charging capacitor 65. These diodes need not conduct the large current conducted by diodes 62, 63.

When the voltage across the secondary winding of transformer 61 is at a high level, one of diodes 62, 63 conducts and current is delivered to the battery. At the same time, current is delivered through one of diodes 70, 71 to capacitor 65 to charge it. Also, current is delivered to capacitor 75 through diode 72, the voltage across capacitor 75 rising with the voltage across capacitor 65, but being less than it by the drop across diode 72. The voltage across capacitor 65 rises to a peak level $E_B$ (assuming that the drops across diodes 62, 63 and 70, 71 are equal) since the voltage at the anodes of the two conducting diodes cannot increase above level $E_B$ plus the drop across the conducting one of diodes 62, 63.

When the voltage across the secondary winding decreases below that level sufficient to maintain one of diodes 62, 63 conducting, capacitor 65 discharges through resistor 43. As soon as the voltage across the capacitor discharges to that level at which the base-emitter junction of transistor 73 is forward biased, the transistor conducts and causes transistor 74 to turn on. This transistor is connected through resistor 76 to the base of transistor 77, which transistor also turns on. Current flows from the battery through transistor 77 and current limiting resistor 67 to discharge the battery.

The operation is very similar to that of the circuit of FIG. 11 except that a separate capacitor 75 if provided to develop a reference voltage at the emitter of transistor 73 instead of using the battery itself to develop a reference voltage at the emitter of transistor 66 in FIG. 11. The duration of the discharge pulse is thus not dependent on the battery voltage. If the charging source now fails, the battery voltage cannot be extended through diodes 62, 63 to the emitter of transistor 73. Although transistor 73 conducts until capacitor 75 discharges, as soon as the capacitor has discharged the emitter-base junction of the transistor is no longer forward biased and transistors 73, 74, 77 remain off. The battery is thus not completely discharged in the case of a source failure.

It is apparent that the charging process of my invention is considerably different from those of the prior art. For example, in the McCulloch charging system, the charging current level is initially below the acceptance level and there is no reason to periodically discharge the battery until the acceptance level falls appreciably below the charging level. Each discharge simply lengthens the total charging time. Nevertheless, discharge pulses in the McCulloch system occur at all times — even when they are not needed at the start of the charging process. Furthermore, even when the discharge pulses do some good in the McCulloch system, they occur at times which are unrelated to the needs of the battery; there is no relation between the acceptance current of the battery, the charging current level, and the rate at which discharge pulses take place. Furthermore, in accordance with the present invention the approach which is taken is different even from that described in my above-identified article. There, what is described is a technique for controlling the charging current so that at all times it does not exceed the acceptance current by an amount which produces significant gassing. Of course, that is also an aspect of the present invention. But a further aspect of the present invention is that the acceptance current is periodically increased by discharging as the charging process progresses to thereby allow a larger charging current which would otherwise have to be reduced in accordance with my prior art teaching.

Although the invention has been described with reference to particular embodiments, it is to be understood that these embodiments are merely illustrative of the application of the principles of the invention. For example, it is apparent that the charging process can be speeded up by initially discharging the battery at a high rate even before charging begins (and then, of course, periodically discharging the battery when the acceptance current falls too low). Also, the comparison between the charging and acceptance currents is performed by monitoring the rate of gas evolution; sensors other than pressure transducers can be used for this purpose. Thus it is to be understood that numerous modifications may be made in the illustrative embodiments of the invention and other arrangements may be devised without departing from the spirit and scope of the invention.

What I claim is:

1. A battery charger for charging a battery having an opening to the atmosphere comprising a charging current source for delivering current to said battery to be charged, means for periodically discharging said battery while it is being charged from said charging current source, transducer means for measuring the rate of gas evolution within said battery, and means for controlling a continuous increase in the duration of the operation of said battery discharging means during successive operations thereof as the measured rate of gas evolution tends to increase.

2. A method for charging a battery having an opening to the atmosphere comprising the steps of:
 a. delivering a charging current to said battery,
 b. periodically discharging the battery while it is being charged by said charging current,
 c. measuring the rate of gas evolution within the battery, and
 d. controlling a continuous increase in the rate of the discharge of the battery as the measured rate of gas evolution tends to increase by causing the discharges of the battery in step (b) to occur at a fixed rate and the durations of the discharges in successive cycles to increase as the battery is progressively charged.

* * * * *